(12) United States Patent
Redeker et al.

(10) Patent No.: US 10,661,827 B2
(45) Date of Patent: May 26, 2020

(54) MOTOR VEHICLE FOR PILOTED DRIVING COMPRISING A FRONT AXLE STEERING SYSTEM AND A REAR AXLE STEERING SYSTEM

(71) Applicant: AUDI AG, Ingolstadt (DE)

(72) Inventors: Michael Redeker, Reichertshofen (DE); Arne Minninger, Wettstetten (DE); Thomas Müller, Ingolstadt/Haunwöhr (DE)

(73) Assignee: AUDI AG, Ingolstadt (DE)

( * ) Notice: Subject to any disclaimer, the term of this patent is extended or adjusted under 35 U.S.C. 154(b) by 419 days.

(21) Appl. No.: 15/735,624

(22) PCT Filed: Jun. 10, 2016

(86) PCT No.: PCT/EP2016/000968
§ 371 (c)(1),
(2) Date: Dec. 12, 2017

(87) PCT Pub. No.: WO2017/001045
PCT Pub. Date: Jan. 5, 2017

(65) Prior Publication Data
US 2020/0039580 A1 Feb. 6, 2020

(30) Foreign Application Priority Data

Jul. 2, 2015 (DE) ........................ 10 2015 008 587

(51) Int. Cl.
*B62D 5/04* (2006.01)
*B62D 9/00* (2006.01)
*B62D 15/02* (2006.01)

(52) U.S. Cl.
CPC ......... *B62D 5/0484* (2013.01); *B62D 5/0487* (2013.01); *B62D 9/005* (2013.01); *B62D 15/021* (2013.01)

(58) Field of Classification Search
None
See application file for complete search history.

(56) References Cited

U.S. PATENT DOCUMENTS 5,020,619 A * 6/1991 Kanazawa ............. B62D 7/159
180/412
5,341,296 A * 8/1994 Yasuno ................. B60T 8/1755
180/197

(Continued)

FOREIGN PATENT DOCUMENTS

CN       104010921 A    8/2014
CN       204341182 U    5/2015

(Continued)

OTHER PUBLICATIONS

International Search Report dated Oct. 7, 2016 from corresponding International Application No. PCT/EP2016/000968 (13 pages).

(Continued)

*Primary Examiner* — Richard M Camby
(74) *Attorney, Agent, or Firm* — Maier & Maier, PLLC

(57) ABSTRACT

A motor vehicle for piloted driving including a front axle steering system and a rear axle steering system. In the active, trouble-free driving state with a piloted driving, the driving task for steering the front axle is performed by a front axle steering control which automatically controls the front axle steering system. A failure of the automatic front axle steering control is automatically recognized with a failure recognition device and the vehicle steering is taken over by the rear axle steering system. The motor vehicle is equipped with a device for controlled wheel-selective brake intervention. In case of a failure of the automatic front axle steering control, this device is controlled in such a way that an automatic centering of the front axle steering system is performed by wheel-selective braking interventions.

5 Claims, 2 Drawing Sheets

(56) References Cited

U.S. PATENT DOCUMENTS

Figure 1:
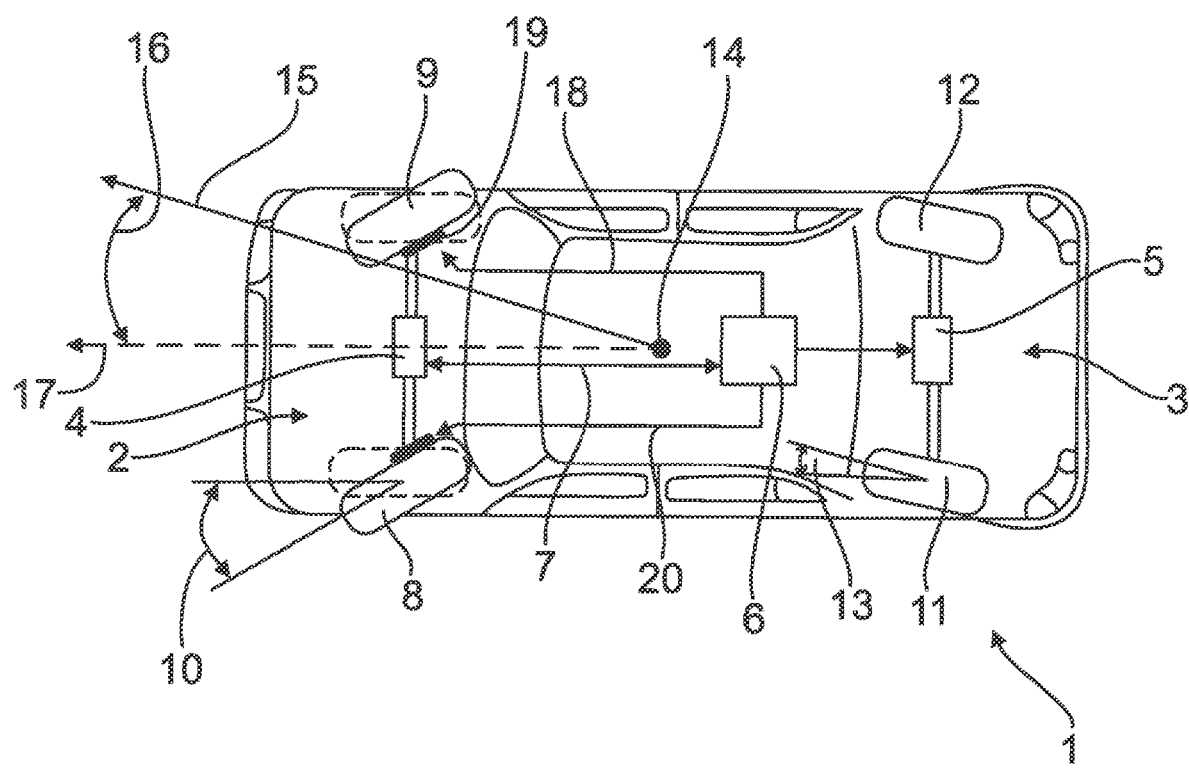

| | | | |
|---|---|---|---|
| 7,878,291 B2* | 2/2011 | Pohl | B60T 8/1755 |
| | | | 180/408 |
| 2009/0133954 A1* | 5/2009 | Pohl | B60T 8/1755 |
| | | | 180/421 |
| 2014/0277893 A1 | 9/2014 | Rosol et al. | |
| 2015/0158499 A1 | 6/2015 | Koravadi | |

FOREIGN PATENT DOCUMENTS

| | | |
|---|---|---|
| DE | 102006028957 A1 | 12/2007 |
| DE | 112004001258 B4 | 2/2012 |
| DE | 102012207548 A1 | 11/2012 |
| EP | 0328002 A2 | 8/1989 |
| EP | 1529718 A1 | 5/2005 |
| EP | 2594458 A2 | 5/2013 |
| EP | 2767455 A2 | 8/2014 |
| GB | 2448471 A | 10/2008 |

OTHER PUBLICATIONS

German Search Report dated May 3, 2016 from corresponding German Application No. 10 2015 008 587.5 ( 6 pages).
International Preliminary Report on Patentability dated Jan. 11, 2018 in corresponding International Application No. PCT/EP2016/000968 (7 pages).

* cited by examiner

MOTOR VEHICLE FOR PILOTED DRIVING COMPRISING A FRONT AXLE STEERING SYSTEM AND A REAR AXLE STEERING SYSTEM

FIELD

The invention relates to a motor vehicle for piloted driving comprising a front axle steering system.

BACKGROUND

Motor vehicles can be already equipped with an intelligent driver assistance system for piloted driving in street traffic. With piloted driving, the driver of the vehicle is allowed temporarily not to have to participate in what is going on in the traffic and in the driving tasks, in particular when accelerating, decelerating and steering are carried out automatically. In an activated, trouble-free driving state called "piloted driving", the driving task of "steering of the front axle" is therefore carried out by means of a front axle steering control, which controls the front axle steering system automatically with an electric power steering system (EPS system). In the event of a failure of this steering system, the driving task "steering" must be taken over for a defined transitional time period by a redundant system.

A generic motor vehicle for this purpose that is already known (GB 2 448 471 A) is provided with a front axle steering system and with a rear axle steering system. If a failure a failure of the front axle steering system is detected with a failure detection device, the steering of the motor vehicle is taken over by the rear axle steering system. Specifically, a direct coupling of the front axle steering to the rear axle steering by means of a switchable coupling is used for this purpose. As a result, an actuator of the rear axle steering takes over also as an actuating element of the front axle steering.

In addition, a motor vehicle equipped with steerable front wheels and with a steering function on the rear wheels is known is also known (EP 1 529 718 A1), which is provided with a system for building up a counter-yaw moment for stabilization of the motor vehicle based on a wheel-individualized brake pressure, and with a reduction of a side slip angle based on the steering function on the rear wheels. The system operates independently of a fault of the front axle steering.

Furthermore, a vehicle is also known (DE 10 2012 207 548 A1), wherein when this is necessary, there is a possibility to initiate a yaw movement of the vehicle with targeted, wheel-selective brake intervention.

It is therefore well known that in case of a failure of the front axle steering control, the steering task can be taken over by the rear axle steering system. However, experiments have shown that simply adjusting the rear axle steering angle is not sufficient with a faulty front steering system, in particular with vehicles moving fast on the roads, in order to influence to a decisive extent the maneuvering of the vehicle and the direction of the travel. Only the slide slip angle is adjusted and the vehicle essentially continues traveling straight ahead.

SUMMARY

The objective of the invention is therefore to further develop a generic motor vehicle in such a way that a functional maneuvering of a vehicle is enabled with piloted driving so that the rear steering system can be used with a failure of the front steering control.

This objective is achieved so that when automatic front axle steering fails, a device for controlling wheel-selective braking carries out automatic centering of the front axle steering system according to a straight orientation of the front wheels, with wheel-selective brake interventions and without a front steering angle impact means. The wheel-selective brake interventions are used to provide compensation for the lateral force of the tires that is created due to the side slip angle of the vehicle, so that the vehicle can be maneuvered by means of the steering system on the rear axle.

Specifically, a predetermined rear axle steering angle is adjusted for a defined transition time period in case of a failure of the automatic front axle steering control and without a manual torque. In addition, active centering of the front steering system that is independent of the side slip angle is carried out with wheel-selective brake interventions at the front axle to provide compensation for lateral tire forces, which are created due to the slide slip angle as an angle between the direction of the movement and the longitudinal axis of the vehicle. Only a similar compensating force element applied to an individual wheel makes it possible to maneuver the vehicle by means of steering the vehicle at the rear axle.

Active centering of the front steering system can take place in a fault-free, piloted driving state by means of an actuator, which can be provided with an electric motor serving as an actuating motor. In particular, a failure of the electric motor and of the control can be thus monitored. Such a monitoring can be carried out directly with sensors at the actuator and/or when required indirectly with multiple redundancy when a predetermined target steering angle cannot be adjusted or maintained.

For the control/adjustment of the active centering, in particular also in connection with the wheel-selective brake interventions, the measured values of a front axle steering sensor, in particular of a steering wheel angle sensor, can be evaluated as the values of an actual value transmitter.

Furthermore, it is also proposed that for the redundant handing over of the steering task with a faulty automatic front axle steering control via the rear axle steering system in connection with the active centering of the front axle steering system, a defined transition time period is established, during which the vehicle is automatically controlled in the lateral direction in a side strip of a driving lane and when necessary decelerated and stopped.

BRIEF DESCRIPTION

The invention will now be further explained with reference to a figure.

Figure 2:
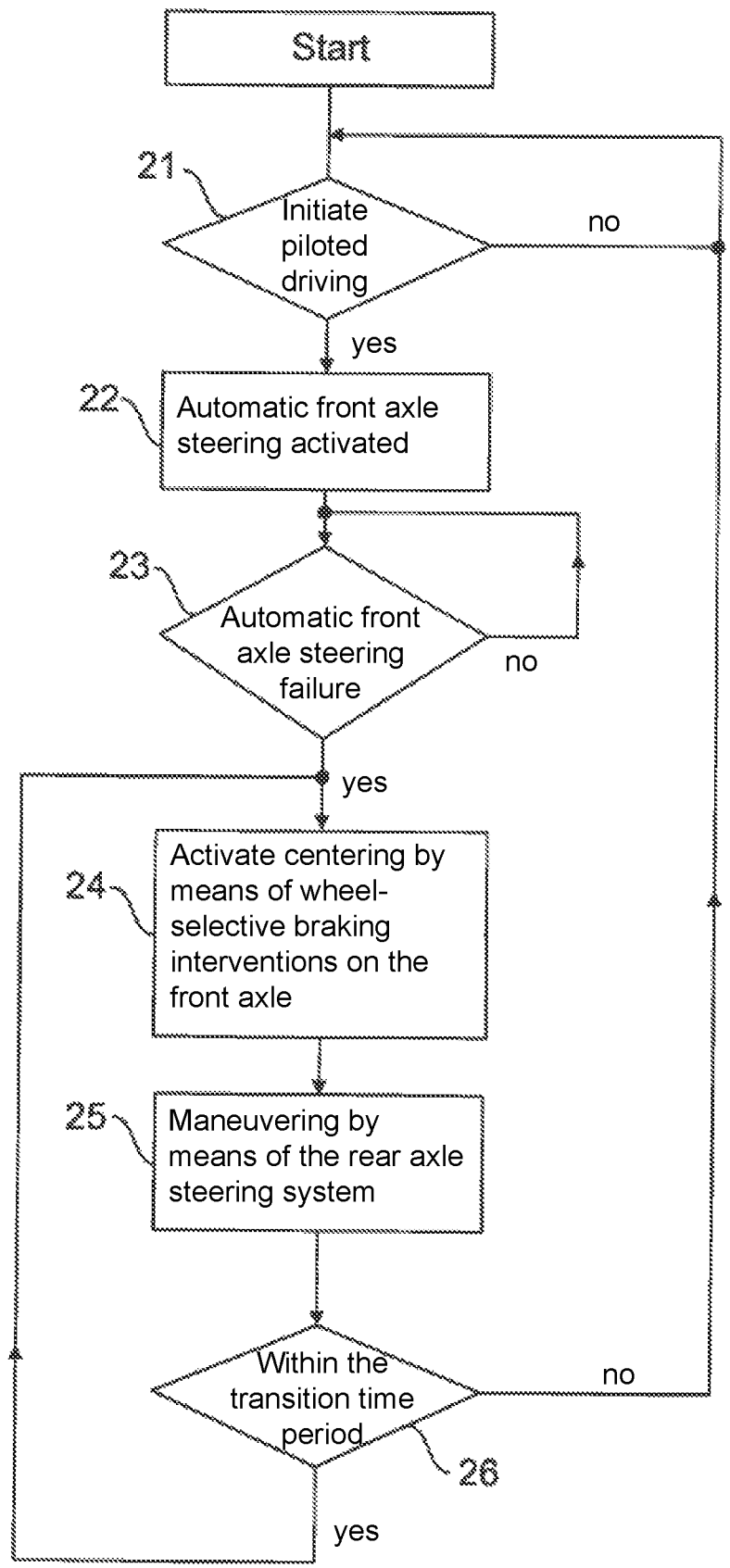

The figures show the following:

FIG. 1 a schematic representation of a motor vehicle for piloted driving with a front axle and a rear axle steering system; and FIG. 2 an example of a flowchart describing the individual process steps.

DETAILED DESCRIPTION

FIG. 1 shows a schematic top view of a motor vehicle 1, which is equipped for piloted driving and provided with a front axle steering system 2 and with a rear axle steering system 3.

The front axle steering system 2 is provided with a front axle actuating motor 4 and the rear axle steering system 3 is provided with a rear axle actuating motor 5.

The motor vehicle 1 contains in addition also a control device 6 (indicated only schematically), by means of which the front axle steering control is carried out automatically via a front axle steering line 7 during piloted driving (without manual torque) by controlling the front axle actuating motor 4, wherein as shown in FIG. 1, the left front wheel 8 and the right front wheel 9 are respectively impacted with a front axle steering wheel angle 10. Accordingly, the rear wheels 11, 12 are at that point impacted by means of the rear axle actuating motor 5 into a rear axle steering wheel angle 13. When the driving is predetermined in this manner, the resulting current movement direction of the vehicle's center 14 in a left curve will correspond to the direction indicated by arrow 15, with a side slip angle 16 between the vehicle's longitudinal axis 17 and the current movement direction corresponding to the arrow 15.

The front axle actuating motor 4 contains for example a failure detection device, which detects a failure of the front axle motor 4, and thus also of the front axle steering control of the front axle system 2, and communicates it via the front axle control line 7 of the control device 6. In this case, the rear axle steering system 3 is controlled by the control device 6 in such a way that the steering system takes over the steering task for the motor vehicle 1.

In this case, the control device 6 will in addition also carry out an automatic centering of the front axle steering system 2 by means of wheel-selective break interventions that are used to adjust the front wheel 8, 9 into the straight ahead position without setting and keeping a front wheel angle impact, as shown by the dashed lines indicating the front wheels 8, 9. For this purpose, in the illustrated driving situation, the front wheel 9 is wheel-selectively braked with the brake 19 of the control device 6 via a brake control line 18 in order to obtain the required centering, without which the driving task cannot be handed over in a targeted manner to the rear axle steering system 3 in case of a failure of the front axle steering system 2. For example, when it is detected by a front wheel angle sensor (not shown) that the front wheel steering angle is in the other direction, the front wheel 9 is wheel-selectively braked for an automatic centering by means of a brake control line 20.

In order to illustrate the invention, the structural components, functional elements and control lines are shown in FIG. 1 as individual components. These individual components are optionally integrated in modern vehicles, or they can be also integrated with other functions in higher-level control units and regulating units, so that control signals can be in particular routed via the bus systems. These embodiments are also to be comprised in this invention.

In accordance with the flowchart shown in FIG. 2, after the start, it is detected in the decision diamond 21 whether the driver of the vehicle has activated the driver assistance system "piloted driving".

In the case when it is activated, the automated front axle steering is also activated according to the status check in rectangle 22 in connection with other measures.

In the decision diamond 23, it is constantly checked whether the automated front axle steering has failed.

When a failure is determined, the active centering of the front axle steering according to the status rectangle check 24 is carried out with wheel-selective braking interventions on the front axle. In addition, maneuvering of the vehicle is carried out according to the status check 25 by means of the rear axle steering system.

In the decision diamond 26, it is checked whether the maneuvering carried out by means of the rear axle steering system in connection with the active center is within a predetermined transition time period in which in particular the vehicle is maneuvered and stopped on a side strip of a driving lane. Depending on an internal diagnosis system and a predetermined safety strategy, it can be signaled to the driver and/or the control can be designed such that the motor can be then further controlled manually, or that the vehicle is no longer drivable.

The invention claimed is:

1. A motor vehicle for piloted driving, comprising:
a front axle steering system and a rear axle steering system, wherein during an activated, fault-free driving state with a piloted driving, a driving task for steering the front axle is carried out automatically by a front axle control controlling the front axle steering system, and
a failure detection device, which automatically detects a failure of the automatic front axle steering control, so that the steering of the vehicle is taken over by the rear axle steering system, wherein the motor vehicle is equipped with a device for controlled wheel-selective braking interventions and this device is controlled in case of a failure of the automatic front axle steering control in such a way that an automatic centering of the front axle steering system is carried out by wheel-selective braking interventions.

2. The motor vehicle according to claim 1, wherein a predetermined rear axle steering wheel angle is adjusted for maneuvering of the motor vehicle for a definite transition period in case of a failed automatic front axle steering control, without the initiation of a manual torque, and an active slide slip angle-dependent centering of the front axle steering system is carried out with wheel-selective brake interventions on the front axle to provide compensation for lateral tire forces, which are created due to the slide slip angle between the movement direction and the longitudinal axis of the vehicle.

3. The motor vehicle according to claim 1, wherein in the fault-free, piloted driving state, active centering of the front axle steering system is carried out by an electric motor which serves as an actuating motor, and a failure of this electric motor and its control are monitored by the failure detection device.

4. The motor vehicle according to claim 1, wherein measured values of a front axle steering angle sensor are evaluated as values of an actual value transmitter for the control/regulation of the automatic centering.

5. The motor vehicle according to claim 1 wherein a defined transition time period is predetermined for a redundant takeover of the steering task with a failure of the automatic front axle steering control by the rear axle steering system in connection with the automatic centering of the front axle steering system, during which the vehicle is automatically controlled on a side strip of the driving lane and optionally decelerated and stopped.

\* \* \* \* \*